United States Patent [19]

Kato

[11] Patent Number: 4,908,726
[45] Date of Patent: Mar. 13, 1990

[54] DISK CARTRIDE HAVING AN IMPROVED SHUTTER

[75] Inventor: Yoshitake Kato, Ibaraki, Japan

[73] Assignee: Hitachi Maxell, Ltd., Ibaraki, Japan

[21] Appl. No.: 356,877

[22] Filed: May 25, 1989

Related U.S. Application Data

[62] Division of Ser. No. 19,542, Feb. 26, 1987, Pat. No. 4,849,844.

[30] Foreign Application Priority Data

Mar. 1, 1986 [JP] Japan .................................. 61-44891

[51] Int. Cl.⁴ .............................................. G11B 23/03
[52] U.S. Cl. ..................................... 360/133; 369/291
[58] Field of Search ......................... 360/133; 369/291; 206/444

[56] References Cited

U.S. PATENT DOCUMENTS 4,223,361 9/1980 Zaitsu .................................. 360/133

Primary Examiner—A. J. Heinz
Attorney, Agent, or Firm—Antonelli, Terry & Wands

[57] ABSTRACT

A shutter for a disk cartridge comprises a pair of upper and lower side plates of substantially same shape, juxtaposed to each other, and an end plate connected to the upper and lower side plates at one end, and integrally molded from a compound plastic containing a filler and a lubricant having a melt index of 30 to 60. The upper and lower side plates each have a thickness of not more than 1.0 mm and a ratio of the thickness to the surface area of the upper and lower side plates each of 1/5,000 to 1/500. The shutter can be molded at a low cost with a good moldability, and has high mechanical strength, heat resistance and slidability.

5 Claims, 7 Drawing Sheets

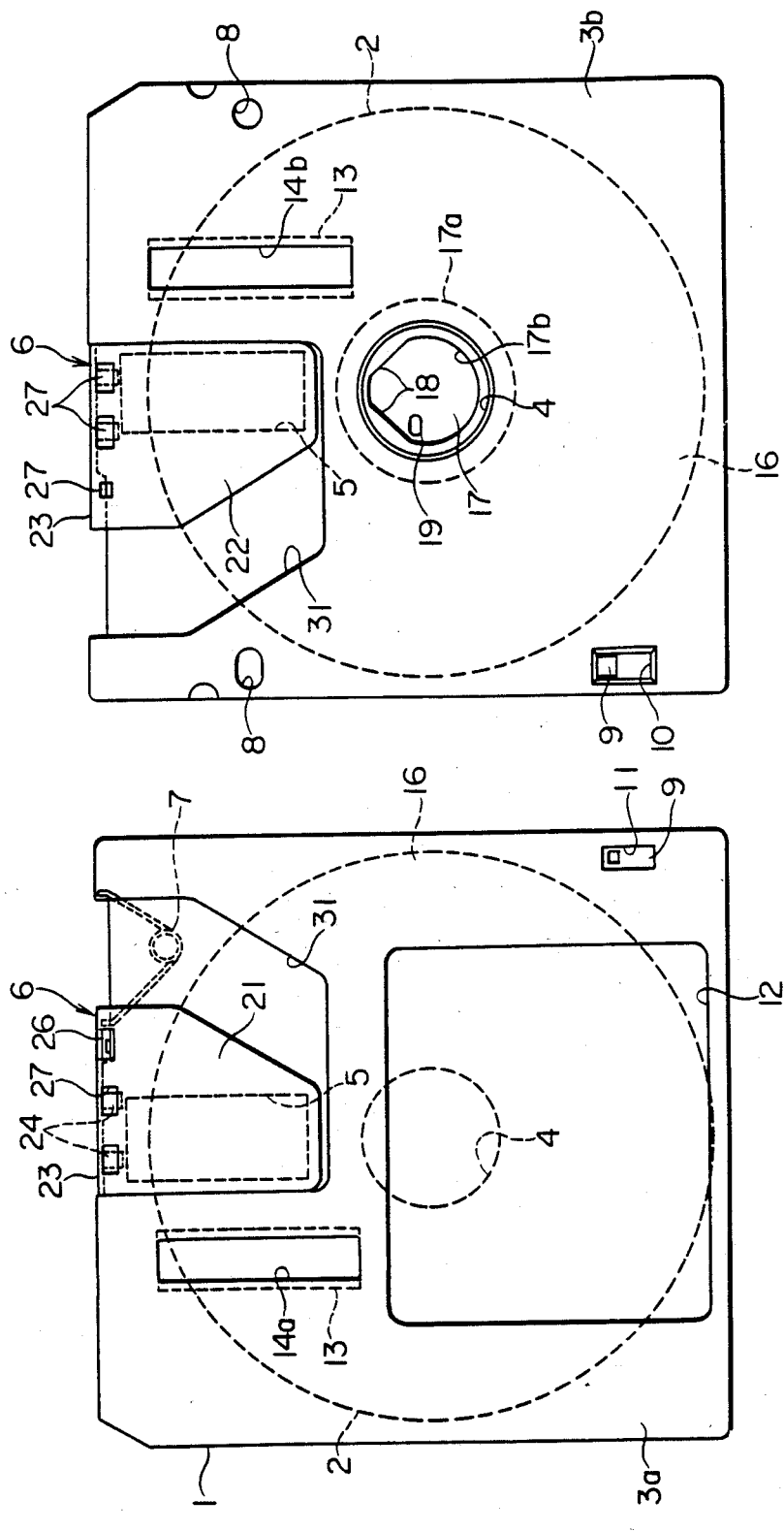

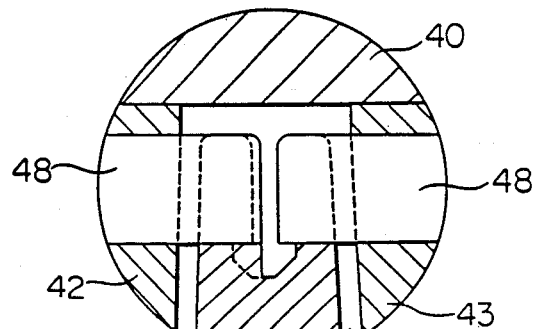
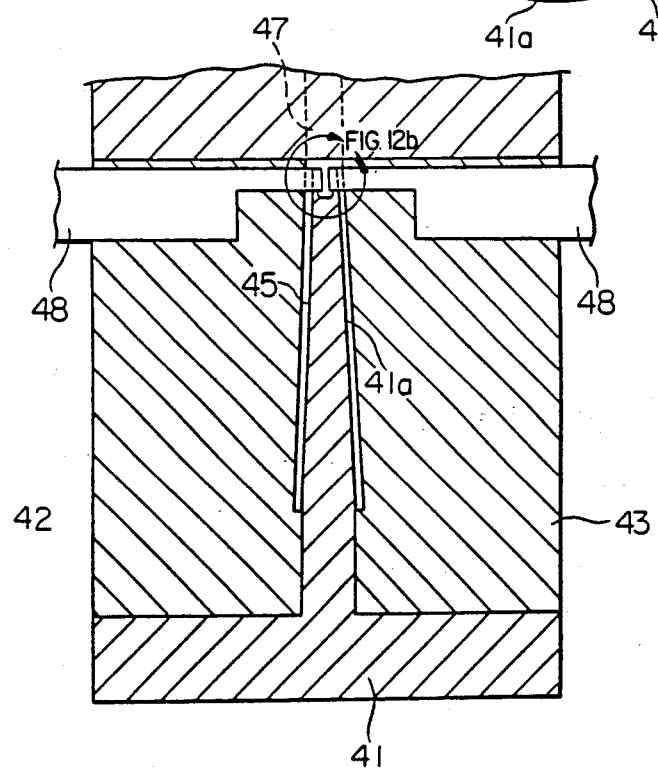

DISK CARTRIDE HAVING AN IMPROVED SHUTTER

This is a divisional of application Ser. No. 019,542, filed Feb. 26, 1987, now U.S. Pat. No. 4,849,844.

BACKGROUND OF THE INVENTION

This invention relates to a disk cartridge encasing such a disk as a magnetic disk, an optical disk, etc., and more particularly to an improvement of materials for a shutter to be provided on the outside of a cartridge case to open or close head insert openings of the cartridge case.

The shutters so far used are made from a thin stainless steel sheet and have a U-shaped cross-section. The shutters have an opening substantially the same shape as that of the head insert openings, engaging lugs for preventing the shutter from slipping out of the case, a spring-fixing lug, etc. on the shutter side plates. The metallic shutters have no problem with respect to their strength, but are liable to scrape the plastic cartridge case surface through contact with the peripheral edge, lugs, etc. of the shutters, and the scrapings are liable to fall into the cartridge case and deposit onto the disk or head, causing a dropout, etc.

To overcome such inconveniences as above and also to reduce the production cost, shutters molded from plastics have been proposed [for example, Japanese Patent Application Kokai (laid-open) No. 60-231985], where the upper side plate and the lower side plate, which are juxtaposed to each other in the case thickness direction, and an end plate connected to the upper and lower side plates at one end are integrally molded by injection molding. Generally, the reasons for using a thin stainless steel sheet (thickness: 0.2-0.3 mm) as a material for forming a shutter in the prior art are that the thin stainless steel sheet can satisfy requirements for strength, such as mechanical strength, wearing resistance, etc. and requirements for smaller sizes and smaller thickness at the same time, and further that it undergoes no rusting and thus can give an aesthetic merit. Needless to say, it is desirable that a shutter made from plastics must also satisfy the similar structural and functional requirements.

With recent developments of novel molding plastic materials and their compounding with other materials, molded plastic articles have been given higher functions. Furthermore, with improvements of molding technique, etc., even plastic articles of much complicated shape can be molded with high precision. That is, even those articles that have been so far regarded as unmoldable can be now molded from plastics. However, it has been still difficult to replace the shutter made from a thin stainless steel sheet with a plastic-molded shutter, since the requirements for the production technique or for the strength have not been fully satisfied.

The most important problem in the molding technique resides in the extremely thin upper and lower side plates constituting a shutter, and the large area of the side plates, as compared with the plate thickness. In other words, when molten resin is to be poured into a thin molding space of much large surface area, the molten resin cannot be uniformly and surely extended throughout the molding space, for example, even by elevating the pouring pressure to a considerable degree, since the surface area is too large. Furthermore, since the distance between the upper and lower side plates is as small as 2-3 mm, the core placed between the upper and lower side plates to partition one off another cannot be cooled. That is, there is another problem that mold cooling cannot be carried out uniformly.

The shutter for use in the disk cartridge has a U-shaped cross-section, where the upper and lower side plates are supported substantially at their joint parts to the end plate like cantilevers, and thus large moments are liable to develop at the joint parts. That is, there is a structural problem such as easy breakage. Still furthermore, the shutter must thoroughly withstand even an impact load at falling and also must have a good sliding characteristic.

SUMMARY OF THE INVENTION

The present invention has been made in the foregoing technical backgrounds and an object of the present invention is to provide a plastic shutter having a good mechanical strength, capable of being molded on a mass-production scale with a good moldability.

That is, in the present invention a shutter is molded from a composite plastic containing a filler, that is, a reinforcing filler. The plastic for use in the present invention as a base material is selected mainly from theromoplastic materials such as polyacetal, nylon, polybutylene terephthalate, polyester, polypropylene, polyethylene, polyfluoroethylene, etc.

The filler for use in the present invention is selected from materials in a granular, whisker or plate shape, incapable of melting at the molding temperature such as calcium carbonate, potassium titanate, silica, talc, etc., and 5 to 30% by weight, preferably 10 to 20% by weight of the filler is contained in the composite plastic.

It is also preferable to add a lubricant to the composite plastic. The lubricant for use in the present invention is selected from silicnnes such as silicone oil, etc., fluorocarbons such as fluoroethylene, aliphatic acids and their esters such as stearic acid, oleic acid, n-butyl stearate, etc., hydrocarbons such as liquid paraffins, squalane, etc., graphite, molybdenum disulfide, carbon black, etc. 0.1 to 10% by weight, preferably 0.5 to 2.0% by weight of the lubricant is contained in the compound plastic.

It is essential that the composition comprises a plastic as a base material and a filler according to the present invention and it is preferable that the composition has a melt index (JIS K-7210) of 30 to 60, preferably 35 to 45 in a molten state. In an ordinary molding, a polymeric material having a melt index of about 9, i.e. a relatively large molecular weight is used as the base material. That is, a polymeric material having a small molecular weight is preferably used in the present invention.

Below 5% by weight of the filler, the molded article will have a poor heat resistance and is liable to undergo deformation at a temperature as high as 60° C., also showing a poor mechanical strength and easy breakage, whereas above 30% by weight, the molten compound plastic will have poor flowability and a poor moldability. The wide range of the mixing ratio of the lubricant is ascribable to differences in the characteristics of the individual lubricants, and is based on the requirements for equivalent or superior mold release characteristics and lubricity of a shutter to those of the metallic shutter. Above 10% by weight of the lubricant, the mechanical strength of the shutter will be lowered. Thus, the mixing ratio of the lubricant can be not more than 10% by weight.

As shown in FIGS. 1 and 2, a shutter comprises an upper side plate 21, a lower side plate 22 having substantially the same shape as that of the upper side plate 21, the upper and lower side plates 21 and 22 being juxtaposed at a small distance, and an end plate 23 connected to the upper and lower side plates 21 and 22 at one end, showing a U-shaped cross-section. The thickness of the end plate 23 has somewhat more degree of freedom than that of the upper and lower side plates, and can be made larger. That is, a pouring gate for the molten composite plastic can be provided at a plurality of locations on the end plate. On the other hand, the thickness of the upper and lower side plates 21 and 22 must be not more than 1.0 mm, and thus a ratio of thickness to surface area of the upper or lower side plate is a problem. When the upper or lower side plate is not more than 1.0 mm, the ratio of thickness to surface area of the upper or lower side plate must be 1/5,000 to 1/500, preferably 1/4,000 to 1/1,000. Below 1/5,000, it is difficult to mold the compound plastic containing the filler, and also the molding cycle will have a problem and no reliable molding precision can be obtained above 1/500, the length or width of the upper or lower side plate will be too small, and the molded shutter cannot have a thorough mechanical strength.

BRIEF DESCRIPTION OF THE DRAWINGS

FIG. 1 to FIG. 5 shows a shutter for a disk cartridge according to a first application embodiment of the present invention, where FIG. 1 is a plan view, FIG. 2 is a bottom view, FIG. 3 is a partly cutaway plan view of the essential part showing a shutter and its neighborhood structure, FIG. 4 is a cross-sectional view along the line IV—IV of FIG. 3, and FIG. 5 is a cross-sectional front view of the essential part showing engaging lugs of the shutter.

FIG. 6 is a bottom view of the essential part of the shutter and its neighborhood structure and FIG. 7 is a cross-sectional view along the line VII—VII of FIG. 6.

FIG. 8 is a plan view of the essential part and FIG. 9 is a cross-sectional view along the line IX—IX of FIG. 8.

FIG. 10 to FIG. 12 show schematic structures of a mold for molding shutter according to the present invention, where FIG. 10 is a perspective view of a disassembled mold, FIG. 11 is a cutaway front view of the essential part of the mold, FIG. 12a is a vertical cross-sectional view of the mold, and FIG. 12b is an enlarged view of a portion of FIG. 12a.

DETAILED DESCRIPTION OF THE PREFERRED EMBODIMENTS

Figure 3:
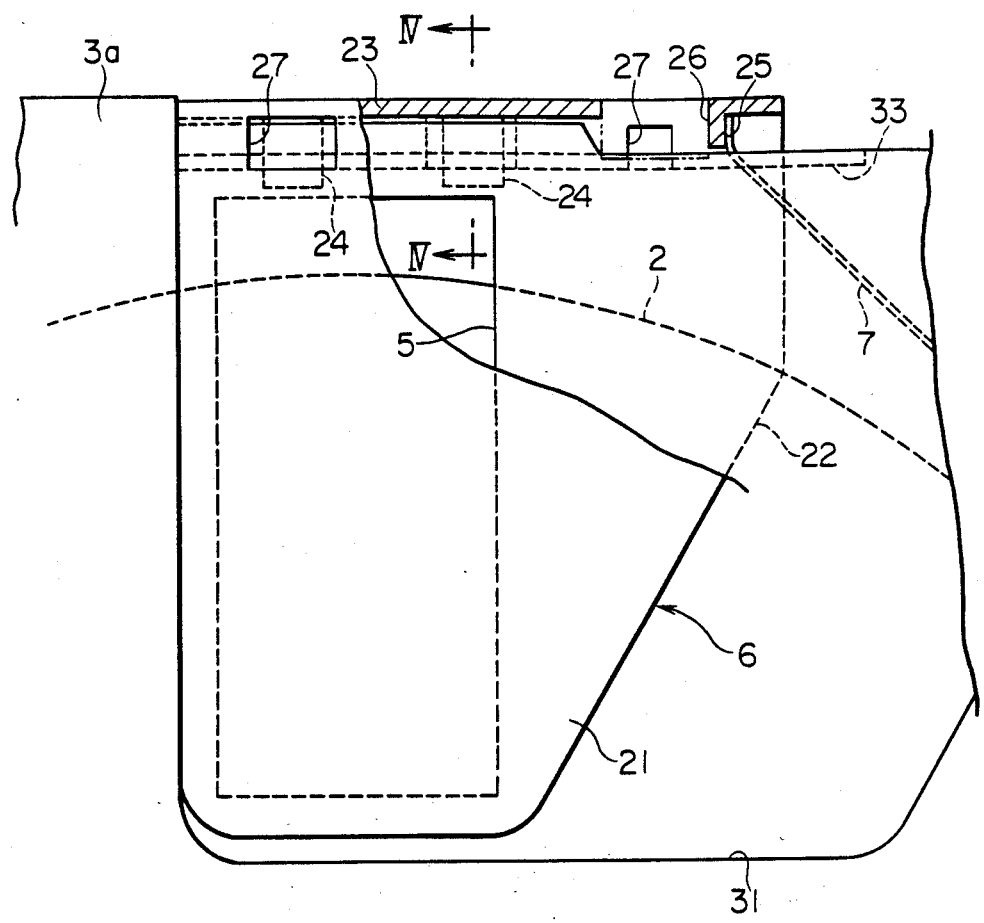

Shutters for a disk cartridge according to some application embodiments of the present invention will be described in detail below, referring to the drawings.

Application Embodiment 1

A shutter for a disk cartridge according to a first application embodiment of the present invention is shown in FIGS. 1 to 5.

In FIGS. 1 to 3, a disk cartridge (nominal size: 2.5 inch) is composed of a rectangular case 1 and a disk 2 rotatably encased therein. The case 1 is composed of upper and lower shells 3a and 3b joined together at the brims to form a hollow inside. The lower shell 3b has a circular driving shaft insert opening 4 substantially at the center thereof, and both upper and lower shells 3a and 3b each have a rectangular head insert 5 at a position near the front end. The head insert openings 5 are brought into an open or closed state by the shutter 6.

The shutter 6 is supported slidably in the lateral direction of the case 1, and kept by the force of a spring 7 at a position to close the head insert openings 5 when the disk cartridge is not charged into a disk drive, while the shutter 6 undergoes opening operation against the force of the spring 7 when charged into the disk drive.

The lower shell 3b further has insert holes 8 for a positioning pin, an operational groove for operating a light protect notch 9 and a recess 12 for pasting a label, as shown in FIG. 1. Cleaning members 13 capable of sandwiching the disk 2 through liner sheets not shown in the drawings are provided on the inside surfaces of the upper and lower shells 3a and 3b at a position on the disk-coming side in the disk rotating direction as viewed from the head insert openings 5. These cleaning members 13 are supported from the outside of the case through operational openings 14a and 14b provided through the walls of the upper and lower shells 3a and 3b to make cleaning of the disk 2 and prevent the flapping of a magnetic sheet 16 as driven.

The disk 2 is composed of a circular magnetic sheet 16 and a hub 17 facing the said driving shaft insert opening 4 as fixed at the center of the magnetic sheet 16. The hub 17 is composed of a flange 17a made from a thin magnetic stainless steel sheet and a boss 17b as outsert fixed thereto. The magnetic sheet 16 is fixed to the flange 17a by adhesion. The boss 17b has a chevron-shaped positioning part 18 for concentrically positioning the entire disk with respect to the driving shaft of the disk drive, whereas the flange 17a has a driving hole 19 with which a driving pin is engaged.

The shutter 6 is formed from a compound plastic by integrally injection molding an upper side plate 21 and a lower side plate 22 to be brought outwardly in contact with the upper and lower shells 3a and 3b, and an end plate 23 connected to the upper and lower side plates 21 and 22 at the front ends. Projected from the end plate 23 are a pair of engaging lugs 24 for slidably supporting the shutter 6 to prevent the shutter 6 from slipping out of the case 1 and a spring-hooking lug 25 for fixing the spring 7 at one end. Furthermore, an operational opening 26 for opening or closing operation of the shutter 6 is provided as notched on the shutter 6 from the front end of the upper side plate 21 over to the end plate 23. The upper and lower side plates 21 and 22 are provided with openings 27 used for withdrawing slide cores at the positions counterposed to the respective engaging lugs 24, and the lower side plate 22 is likewise provided with another opening used for withdrawing a slide core at the position counterposed to the operational opening 26.

Figure 4:
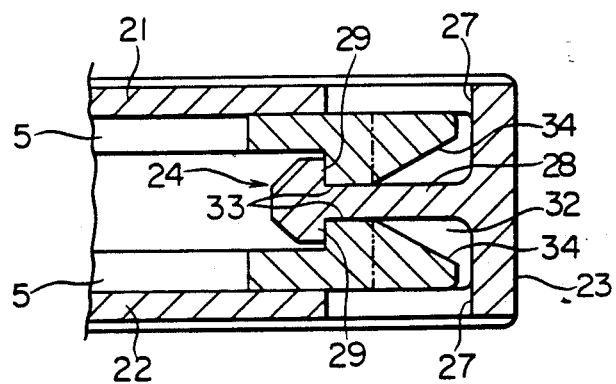
Figure 5:
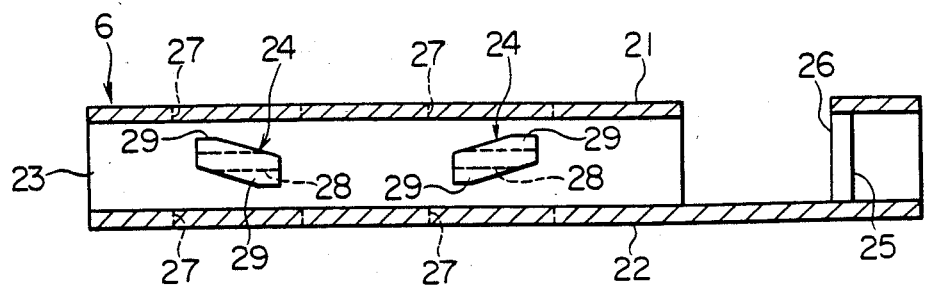

As shown in FIGS. 4 and 5, the engaging lug 24 comprises a lug arm 28 protruded from the end plate 23 and a mushroom cap-shaped lug head 29 laterally extended from the end of the lug arm 28. The lug head 29 has an appearance of a trapezoid shape as viewed from its end side. A pair of the engaging lugs 24 and 24 have axially symmetrical, mutually reversed equal shapes, as viewed from their end sides. The shape of the engaging lug 24 is selected to prevent the shutter 6 from slipping out of the case 1 after its mounting on the case 1, as will be described below.

The upper and lower shells 3a and 3b are each provided, on both outside surfaces, with a pocket 31 i.e. a shallow recess, in accordance with the slidable range of the shutter 6. In the end zone adjacent to these pockets 31 on both outside surfaces of the upper and lower shells 3a and 3b, slide grooves 32 for slidably guiding a pair of the engaging lugs 24 are each provided on the front end walls to be jointed together of the upper and lower shells 3a and 3b to form a slit form opening when the upper and lower shells 3a and 3b are jointed together. The slit-forming open edges of slide grooves 32 serve as engaging ribs 33 for engaging the lug heads 29 of the engaging lugs 24 to prevent the shutter 6 from slipping out of the case 1.

In the area outside the zone where the operational opening 26 of the shutter 6 can be moved, that is, the area convered by the end plate 23 when the shutter 6 is in a closed position, the engaging ribs 33 are provided each with an inclined guide surface 34 toward the front ends of the shells 3a and 3b and continuously along the front ends so as to facilitate the mounting of the shutter 6 onto the case 1.

To mount the shutter 6 onto the case 1, the engaging lugs 24 are positioned against the guide surfaces 34 and the shutter 6 is pushed down in that state, whereby the engaging lugs 24 are engaged with the engaging ribs 33 and held not to slip out of the engaging ribs 33. In this mounting operation, the lug heads 29 of the engaging lugs 24 are temporarily twisted when guided along the guide surfaces 34, and returned to the original state just after the lug heads 29 have passed over the engaging ribs 33. That is, the engaging dimensions (contact area) of both lug heads 29 and engaging ribs are larger than those obtained by inserting the lug heads 29 between the engaging ribs 33 by straight pushing, utilizing only the elastic deformation of the lug heads 29 and the engaging ribs 33, and thus the prevention of the shutter 6 from slipping out of the case 1 can be much more assured.

Main dimensions of shutter 6 applicable to the disk cartridge of 2.5-inch nominal size shown in FIGS. 1 to 5 are as follows:

Length: 24.4 mm
Maximum width: 19.5 mm
Thickness each of the upper and lower side plates 21 and 22: 0.35 mm
Distance between the upper and lower side plates 21 and 22 (inner face basis): 2.1 mm
Area each of the upper and lower side plates 21 and 22: about 412 mm$^2$
Area of the end plate 23: 55 mm$^2$
Depth of the pocket 31: 0.5 mm Application Embodiment 2

Figure 6:
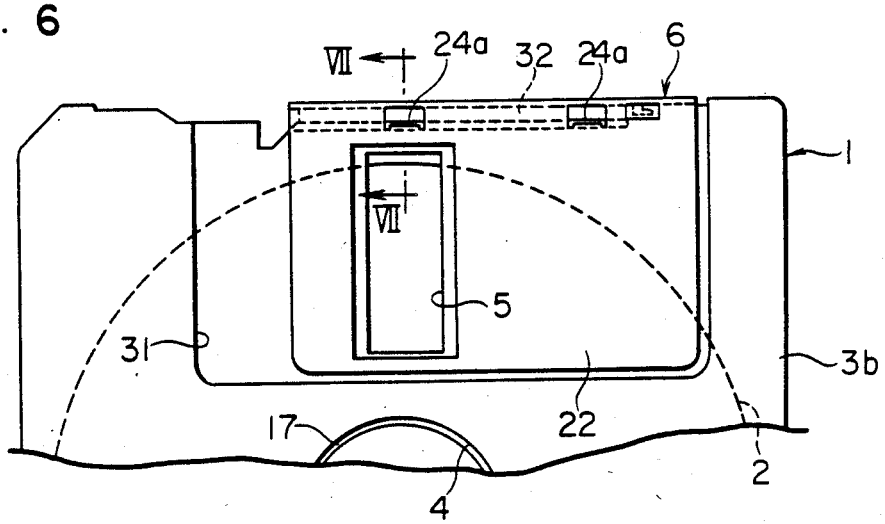
FIG. 6 and FIG. 7 mainly show a shutter for a disk cartridge according to a second application embodiment of the present invention, where
Figure 7:
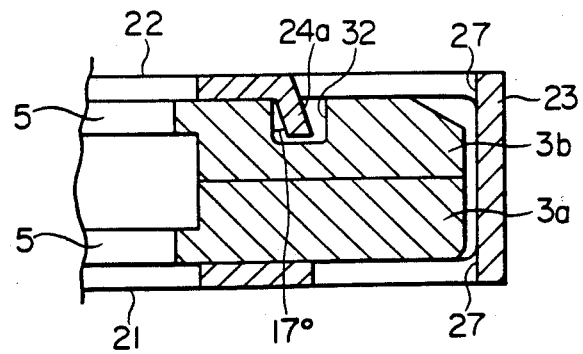

In FIG. 6 and FIG. 7, a second application embodiment of the disk cartridge (nominal size: 3.5 inches) is shown, where a slide groove 32 is provided near and along the front end on the lower shell 3b, and a pair of engaging lugs 24a to be inserted in and engaged with the slide groove 32 is projected from the lower side plate 22 of the shutter 6. The engaging lugs 24a are projected with an inclination of about 17° in the engaging lug slip-out direction i.e. against the wall of the slide grooves 32 as shown in FIG. 7 from the lower side plate 22. When an external force in the engaging lug slip-out direction acts on the shutter 6, the lifting of the engaging lugs 24 by pressing by the wall of the slide groove 32 and its consequent disengagement from the slide groove 32 can be prevented thereby. That is, the outward lifting of the shutter side plates from the case 1 can be prevented by inclining the engaging lugs in the engaging lug slip-out direction as described above, and also passing of the engaging lugs 24a over the edge of the slide groove 32 becomes difficult.

The shutter 6 applicable to the disk cartridge of 3.5-inch nominal size shown in FIG. 6 and FIG. 7 has the following main dimensions.

Length: 31.8 mm
Maximum width: 48.05 mm
Thickness each of the upper and lower side plates 21 and 22: 0.35 mm
Distance between the upper and lower side plates 21 and 23 (inner face basis): 2 mm
Area each of the inner and lower side plates 21 and 22: about 1528 mm$^2$
Area of the end plate 23: 166 mm$^2$
Depth of the pocket: 0.4 mm The members identical with those of the disk cartridge shown in FIGS. 1 to 5 have the same reference numerals in FIGS. 6 and 7.

Application Example 3

Figure 8:
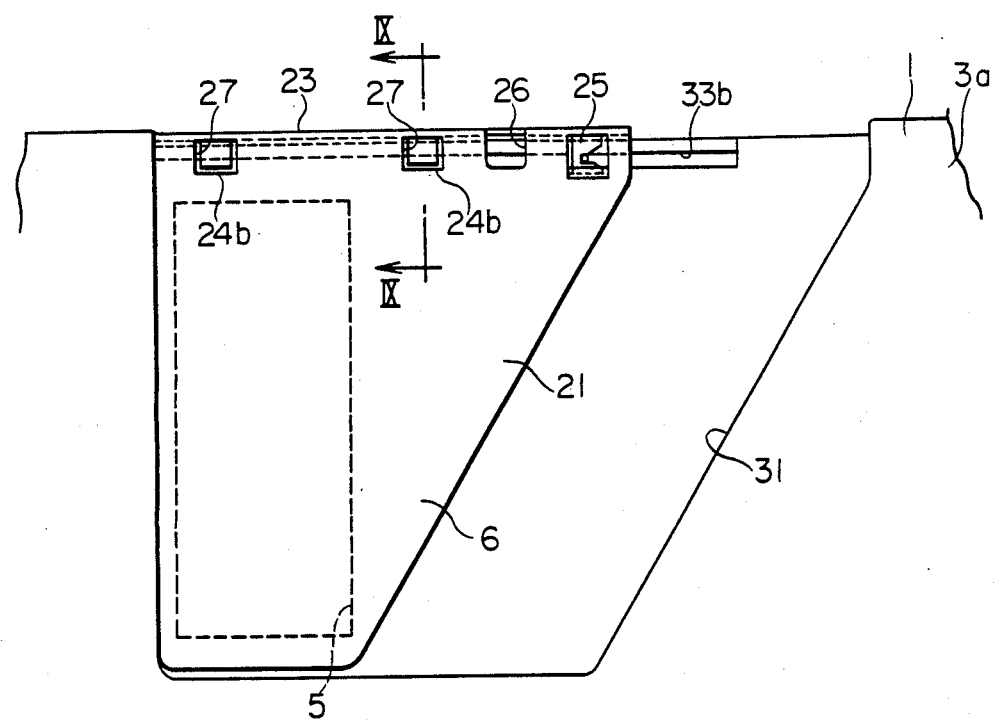
FIG. 8 and FIG. 9 mainly show a shutter for a disk cartridge according to a third application embodiment of the present invention, where
Figure 9:
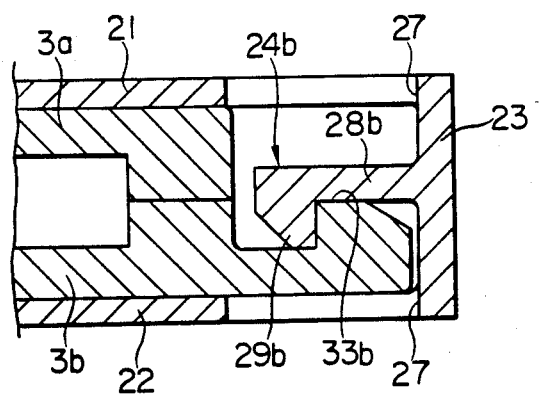

In FIG. 8 and FIG. 9, a third application embodiment of the disk cartridge (nominal size: 5 inches) is shown, where a pair of engaging lugs 24b are projected from the inside surface of the end plate 23. The engaging lug 24b comprises a lug arm 28b and a lug head 29b downwardly projected from the end of the lug arm 28b. Slip-out prevention and slide guiding of the shutter 6 can be carried out by engaging the lug head 29b with an engaging rib 33b projected from the lower shell 3b. In this structure, it is necessary to provide slide grooves on the front end walls of the upper and lower shells 3a and 3b to form a slit form opening, and thus dust intrusion can be prevented.

The shutter 6 applicable to the disk cartridge of 5-inch nominal size shown in FIG. 8 and FIG. 9 has the following main dimensions.

Length: 52 mm
Maximum width: 46 mm
Thickness each of the upper and lower side plates 21 and 22: 0.4 mm
Distance between the upper and lower side plates (inner face basis): 3.2 mm
Area each of the upper and lower side plates 21 and 22: about 1,760 mm$^2$
Area of the end plate 23: 184 mm$^2$
Depth of the pocket 31: 0.5 mm The members identical with those of the disk cartridge shown in FIGS. 1 to 7 have the same reference numerals in FIGS. 8 and 9.

Figure 10:
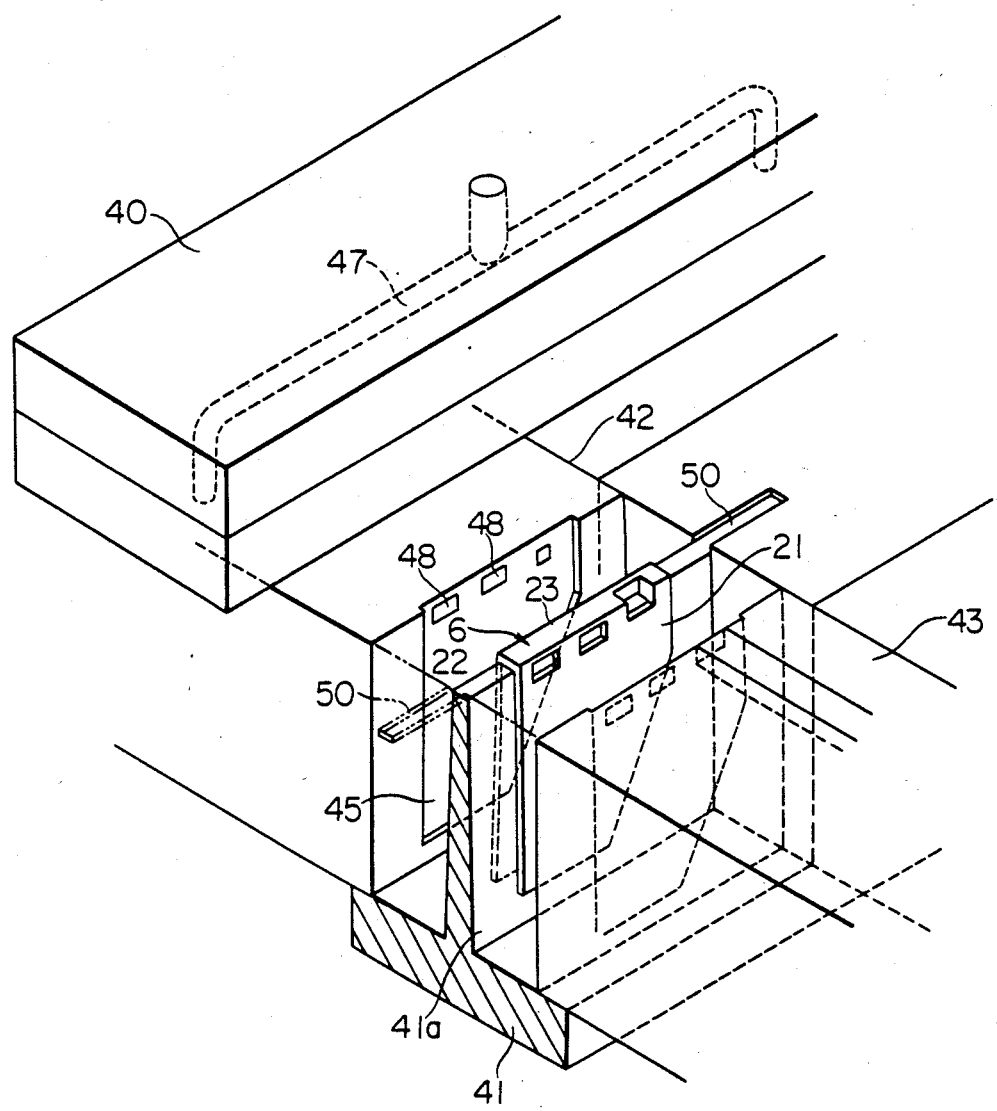
Figure 11:
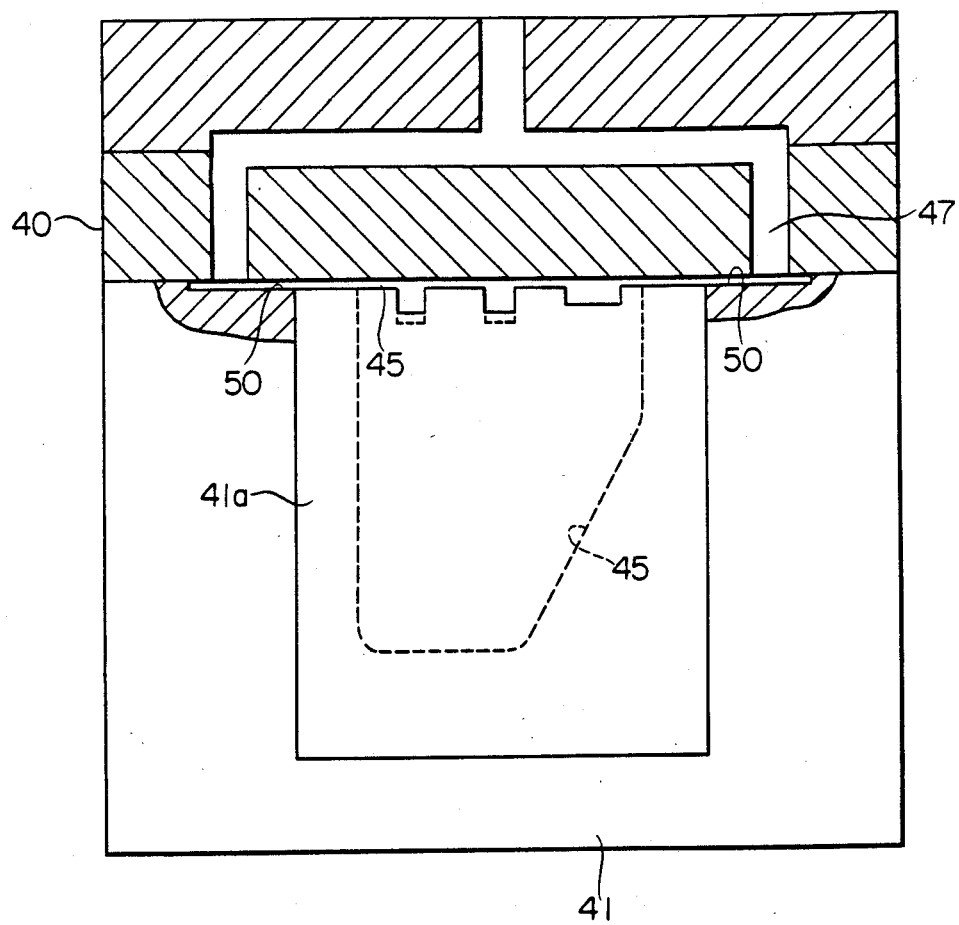

A mold used for injection molding the shutter 6 will be described in detail below, referring to FIGS. 10 to 12.

The mold provides a basic form of cavity 45 by a cover mold 40 whose plane along the outer surface of the end plate 23 of the shutter 6 serves as a mold portion face, a movable mold 41, and a pair of slide cores 42 and 43 surrounding the movable core 41 from the mutually opposite directions. The cover mold 40 has a sprue runner 47. The movable mold 41 has a core 41a corresponding to the inner surface shape of the shutter 6. The core 41a has a trapezoidal cross-section so that the thickness of the core 41a may be larger towards its lower end, that is, towards the free ends of the upper and lower side plates 21 and 22 than the distance between the upper and lower side plates 21 and 22 of the shutter 6 as a base dimension.

To form engaging lugs 24 of the shutter 6, pairs of slide cores 48 and 48 are further provided. The slide cores 48 are wider than the engaging lugs 24 and sandwich and fix the upper end of the core 41a of the movable mold 41 from both sides by both ends of the slide cores 48 in their width direction to hold the thin core in the normal position. The thickness of the upper and lower side plates 21 and 22 can be correctly controlled thereby.

The outer surface shapes of the upper and lower side plates 21 and 22 of the shutter 6 are defined by the slide cores 42 and 43 counterposed to each other at the core 41a, and the shape of the end plate 23 is defined by the cover mold 40 and the movable mold 41. A cavity 50 for gate is formed between the cover mold 40 and the movable mold 41, as connected to the cavity for forming the end plate 23, and is communicated with the sprue runner 47. That is, the cavity 50 for gate is positioned, as extended along and over the molding space for the end plate 23, to guide a molten resin from the sprue runner 47 into the cavity 45 for molding the product.

By providing the cavity 50 for gate having a gate function, as extended over both ends of the cavity 45 for molding the product and directly communicating the cavity 50 for gate with the sprue runner 47, a pressure drop between the terminals of the sprue runner 47 and the cavity 45 can be reduced during the molding of the shutter 6, and the shutter 6 of U-shaped cross-section having a very small plate thickness as compared with the plate surface area can be molded with a higher reliability.

The cavity 50 for gate can be used for knockout purpose, and the molded article can be released from the mold by taking the solidified resin off the cavity 50 for gate with a releasing pin. The shutter 6 as a product can be obtained by cutting the unnecessary parts off the molded article.

EXAMPLE 1

To polyacetal having a melt index of 45 as a base material were added 10% by weight of calcium carbonate having particle sizes of 1 μm as a filler and various ratios of stearic acid as a lubricant in a range of 0.1 to 10% by weight, as shown in Table 1, on the basis of the total mixture. Shutters 6 shown in FIG. 1 were injection molded from the mixtures, using a mold shown in FIG. 10. The melt index of the mixtures was changed from 45 to 60 in accordance with the lubricant.

TABLE 1

| Stearic acid (wt. %) | 0.1 | 0.5 | 1 | 5 | 10 |
|---|---|---|---|---|---|
| Material No. | 1 | 2 | 3 | 4 | 5 |

EXAMPLE 2

In the material No. 3 of Example 1, the mixing ratio and the particle size of calcium carbonate were changed as shown in Table 2, and shutters 6 were molded therefrom in the same manner as in Example 1.

TABLE 2

| Calcium carbonate | | | | | | | |
|---|---|---|---|---|---|---|---|
| Mixing ratio (wt. %) | 1 | 5 | 15 | 20 | 25 | 30 | 35 |
| Particle size (μm) | 0.1 | 0.1 | 0.1 | 0.1 | 0.1 | 0.1 | 0.1 |
| Material No. | 6 | 7 | 8 | 9 | 10 | 11 | 12 |
| Calcium carbonate | | | | | | | |
| Mixing ratio (wt. %) | 1 | 5 | 15 | 20 | 25 | 30 | 35 |
| Particle size (μm) | 1.3 | 1.3 | 1.3 | 1.3 | 1.3 | 1.3 | 1.3 |
| Material No. | 13 | 14 | 15 | 16 | 17 | 18 | 19 |
| Calcium carbonate | | | | | | | |
| Mixing ratio (wt. %) | 1 | 5 | 15 | 20 | 25 | 30 | 35 |
| Particle size (μm) | 5.0 | 5.0 | 5.0 | 5.0 | 5.0 | 5.0 | 5.0 |
| Material No. | 20 | 21 | 22 | 23 | 24 | 25 | 26 |

EXAMPLE 3

In the material No. 3 of Example 1, the melt index of polyacetal was changed, as shown in Table 3. Shutters 6 were molded therefrom in the same manner as in Example 1.

TABLE 3

| Melt index | 30 | 40 | 50 | 60 |
|---|---|---|---|---|
| Material No. | 27 | 28 | 29 | 30 |

EXAMPLE 4

In the material No. 3 of Example 1, potassium titanate in a whisker form was added in place of calcium carbonate, while changing its average fiber length, as shown in Table 4. Shutters 6 were molded therefrom in the same manner as in Example 1. The average fiber diameter of the whisker was 0.3 μm.

TABLE 4

| Average fiber length (μ) | 10 | 12 | 15 | 18 | 20 |
|---|---|---|---|---|---|
| Material No. | 31 | 32 | 33 | 34 | 35 |

EXAMPLE 5

In the material No. 3 of Example 1, graphite was added in place of stearic acid while varying its mixing ratio as shown in Table 5. Shutters were molded therefrom in the same manner as in Example 1.

TABLE 5

| Graphite (wt. %) | 0.1 | 0.5 | 1 | 5 | 10 |
|---|---|---|---|---|---|
| Material No. | 36 | 37 | 38 | 39 | 40 |

EXAMPLE 6

In the material No. 3 of Example 1, polytetrafluoroethylene was added in place of stearic acid, while varying its mixing ratio as shown in Table 6. Shutters 6 were molded therefrom in the same manner as in Example 1.

TABLE 6

| Polytetrafluoroethylene (wt. %) | 0.1 | 0.5 | 1 | 5 | 10 |
|---|---|---|---|---|---|
| Material No. | 41 | 42 | 43 | 44 | 45 |

EXAMPLE 7

In the material No. 3 of Example 1, zinc stearate was added in place of stearic acid, while changing its mixing ratio as shown in Table 7. Shutters 6 were molded therefrom in the same manner as in Example 1.

TABLE 7

| Zinc stearate (wt. %) | 0.1 | 0.5 | 1 | 5 | 10 |
|---|---|---|---|---|---|
| Material No. | 46 | 47 | 48 | 49 | 50 |

EVALUATION TEST

Mechanical strength, heat resistance and slidability of the shutters 6 molded from the foregoing materials Nos. 1 to 50 were determined.

Mechanical strength was determined by applying a load to the free ends of the upper and lower side plates 21 and 22 of the shutter 6 in the direction perpendicular to the plate surface repeatedly in a reciprocating manner for a predetermined time, and observing the presence of cracks on the upper and lower side plates 21 and 22.

Heat resistance was determined by heat resistance test according to JIS K-7207.

Slidability was determined by mounting the shutter 6 onto the case 1, setting the shutter 6 in the closed position by the force of the spring 7 having a given small tension, then moving the shutter 6 to the open position, and making the shutter 6 reset therefrom to the closed position, while investigating the resetting behavior to the closed position through comparison.

The test results are shown in Table 8, where, as to the mechanical strength, the round mark "o" means no cracks and a good restorability; the triangular mark "Δ" means no cracks but a poor restorability; the crossed mark "X" means the presence of cracks, as to the heat resistance, the round mark "o" means good; the triangular mark "Δ" means fair; the crossed mark "X" means poor, and as to the slidability, the double round mark "⊚" means a high reset speed and complete resetting; the round mark "o" means complete resetting; the triangular mark "Δ" means no substantial resetting (resetting halfway); the crossed mark "X" means no complete resetting.

TABLE 8

| Material No. | Mechanical strength | Heat resistance | Slidability |
|---|---|---|---|
| 1 | o | o | o |
| 2 | o | o | o |
| 3 | Δ | Δ | o |
| 4 | Δ | X | ⊚ |
| 5 | Δ | X | ⊚ |
| 6 | o | Δ | o |
| 7 | o | o | o |
| 8 | o | o | o |
| 9 | o | o | o |
| 10 | X | o | o |
| 11 | X | o | o |
| 12 | X | o | o |
| 13 | o | Δ | o |
| 14 | o | o | o |
| 15 | o | o | o |
| 16 | X | o | o |
| 17 | X | o | o |
| 18 | X | o | o |
| 19 | X | o | o |
| 20 | o | Δ | o |
| 21 | X | o | o |
| 22 | X | o | o |
| 23 | X | o | o |
| 24 | X | o | o |
| 25 | X | o | o |
| 26 | X | o | o |
| 27 | o | o | o |
| 28 | o | o | o |
| 29 | o | o | o |
| 30 | o | o | o |
| 31 | o | o | o |
| 32 | o | o | o |
| 33 | o | o | o |
| 34 | o | o | o |
| 35 | o | o | o |
| 36 | o | o | o |
| 37 | o | o | o |
| 38 | o | Δ | o |
| 39 | X | Δ | ⊚ |
| 40 | X | Δ | ⊚ |
| 41 | o | o | o |
| 42 | o | o | o |
| 43 | o | o | o |
| 44 | o | Δ | o |
| 45 | Δ | Δ | ⊚ |
| 46 | o | o | o |
| 47 | o | o | o |
| 48 | Δ | Δ | o |
| 49 | Δ | X | ⊚ |
| 50 | Δ | X | ⊚ |

According to the present invention, a shutter 6 of U-shaped cross-section and low thickness, which has been so far difficult to mold, can be injection molded under the ordinary molding conditions with a higher reliability by mixing a filler and, if necessary, a lubricant into a base plastic material of high melt index such as polyacetal, etc. so as to obtain the desired mechanical strength and slidability, while adjusting the melt index of the resulting compound plastic to 30-60, thereby surely extending the molten compound plastic throughout the mold. The molding cycle can be shortened thereby, and a shutter having a thickness equal to that of the stainless steel sheet can be obtained at a low cost, satisfying the requirements for higher mechanical strength and lower thickness of the side plates of the shutter 6 at the same time.

What is claimed is:

1. A disk cartridge which includes a U-shaped shutter with upper and lower side plates slidably arranged on a cartridge case and made from a plastic comprising 0.1 to 10% by weight of a lubricant by molding such that the thickness of the upper and lower side plates is no more than 1.0 mm.

2. A disk cartridge according to claim 1, wherein 0.5 to 2.0% by weight of the lubricant is contained in the plastic.

3. A disk cartridge according to claim 1 or 2, wherein the plastic has a melt index of 30 to 60.

4. A disk cartridge according to claim 1 or 2, wherein the plastic is at least one thermoplastic material selected from the group consisting of polyacetal, nylon, polybutylene terephthalate, polyester, polypropylene, polyethylene and polyfluoroethylene.

5. A disk cartridge according to claim 1 or 2, wherein the lubricant is at least one member selected from the group consisting of silicones, fluorocarbons, aliphatic acids, aliphatic acid esters, hydrocarbons, graphite, molybdenum disulfide and carbon black.

* * * * *